United States Patent [19]
Ellis et al.

[11] Patent Number: 5,238,367
[45] Date of Patent: Aug. 24, 1993

[54] IMPELLER ASSEMBLY FOR AQUARIUM POWER FILTER

[75] Inventors: Robert Ellis, Wyckoff; Allan H. Willinger, Oakland, both of N.J.

[73] Assignee: Willinger Bros., Inc., Oakland, N.J.

[21] Appl. No.: 867,973

[22] Filed: Apr. 13, 1992

Related U.S. Application Data

[62] Division of Ser. No. 533,739, Jun. 5, 1990, abandoned.

[51] Int. Cl.$^5$ .............................................. F04D 29/18
[52] U.S. Cl. ................... 416/188; 416/200 R; 416/223 R; 210/416.2
[58] Field of Search ................ 416/179, 188, 198 R, 416/200 R, 201 A, 223 R, 223 B, 242, 243, 234; 210/416.2, 169

[56] References Cited

U.S. PATENT DOCUMENTS

| | | | |
|---|---|---|---|
| 470,097 | 3/1892 | Baldwin | 416/200 R |
| 1,001,951 | 8/1991 | Hawkins | 416/243 |
| 1,944,525 | 1/1934 | Pereyra | 416/200 R |
| 2,637,537 | 5/1953 | Ernst | 416/201 A |
| 3,526,467 | 9/1970 | Kime | 416/200 R |
| 3,540,834 | 11/1970 | Allerton | 416/223 B |
| 3,588,280 | 6/1971 | Yedidiah | 416/200 A |
| 3,784,321 | 1/1974 | Woell, Jr. | 416/223 R |
| 3,905,719 | 9/1975 | Minnich | 416/188 |
| 4,735,715 | 4/1988 | Willinger | 210/169 |
| 5,108,257 | 4/1992 | Fukazawa et al. | 416/223 B |

FOREIGN PATENT DOCUMENTS

| | | | |
|---|---|---|---|
| 62998 | 4/1982 | Japan | 416/188 |
| 522166 | 6/1940 | United Kingdom | 416/223 R |

*Primary Examiner*—Edward K. Look
*Assistant Examiner*—James A. Larson
*Attorney, Agent, or Firm*—Helfgott & Karas

[57] ABSTRACT

A water pump including a rotating impeller is located between the two filter chambers, and pumps water from the aquarium tank, via the inlet conduit, into a corridor which communicates with the two filter chambers. The impeller is constructed with relatively closely spaced radially extending blades, each of which is formed of a circular disk. A base edge, or chord, of each blade is inclined upon a frustoconical surface of a central hub of the impeller.

7 Claims, 8 Drawing Sheets

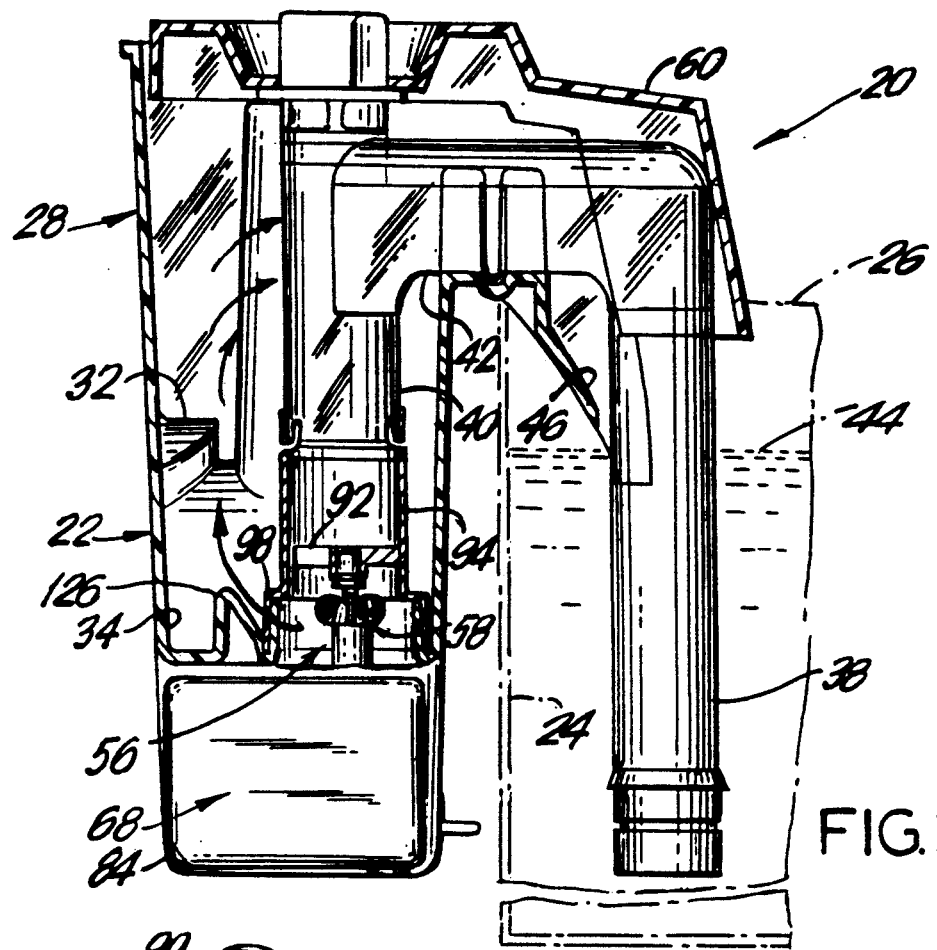
FIG. 3
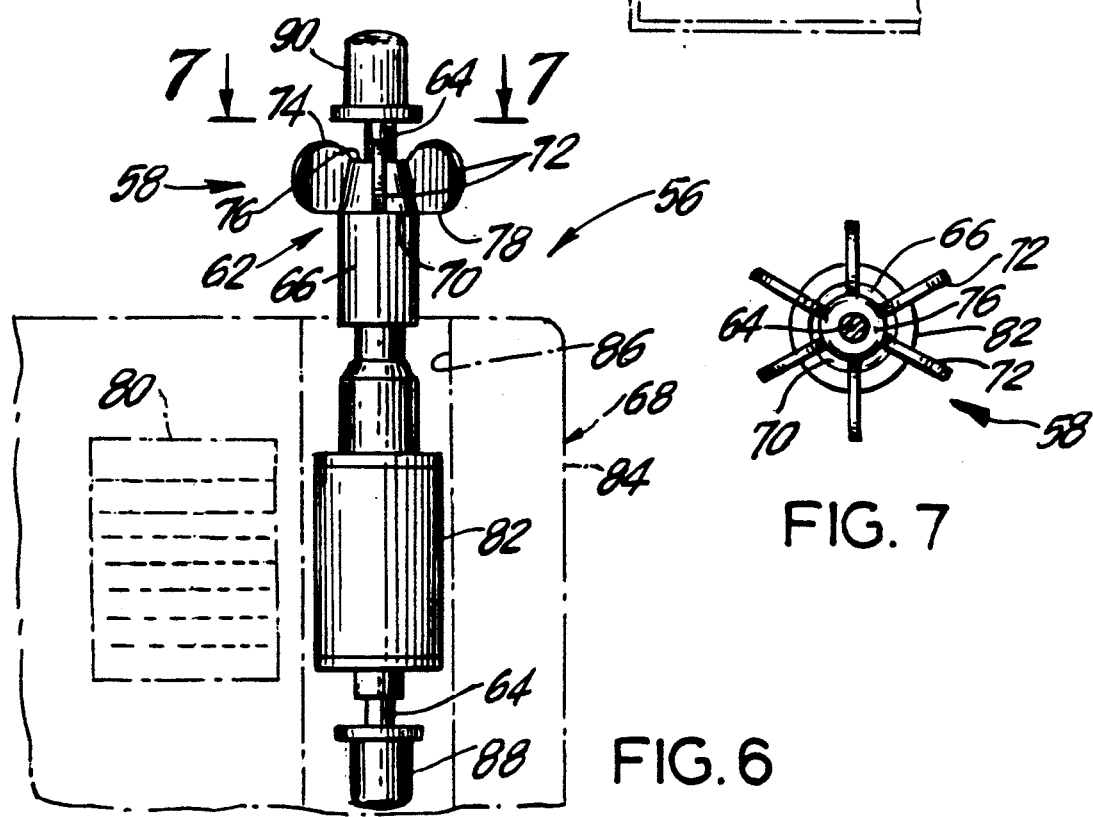
FIG. 7
FIG. 6

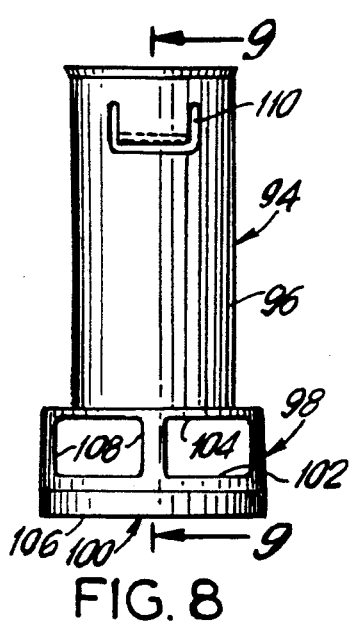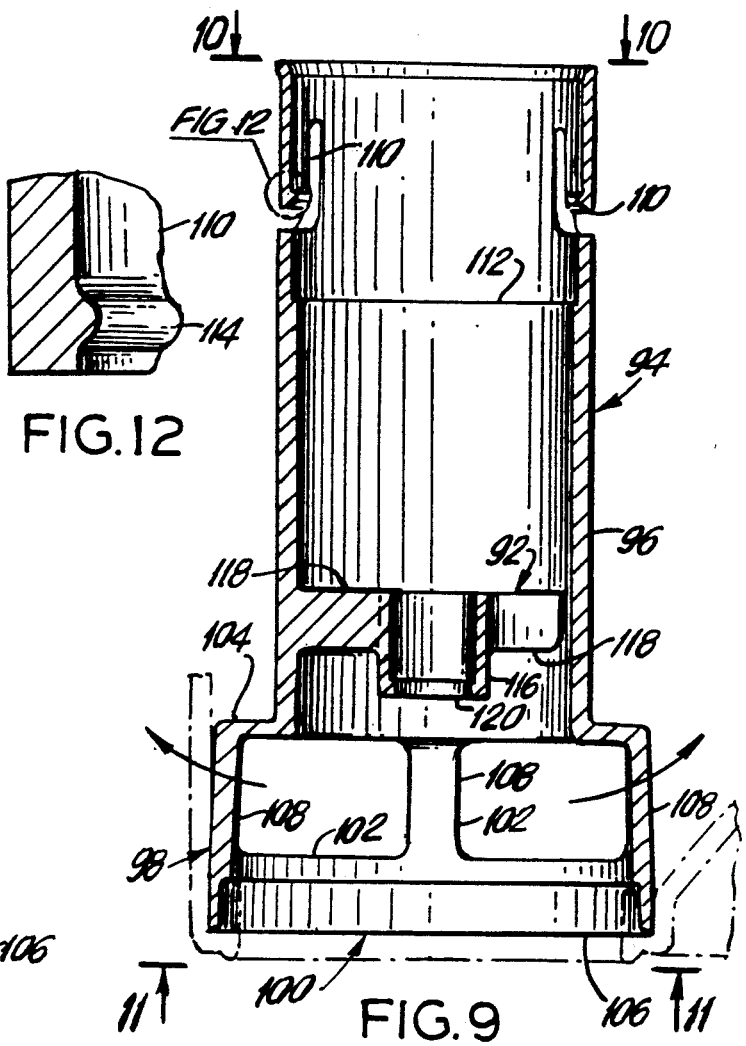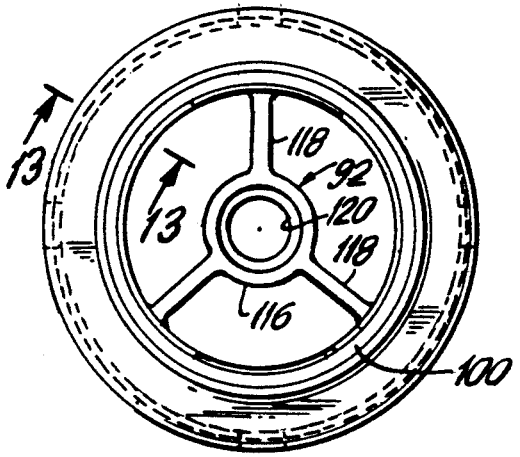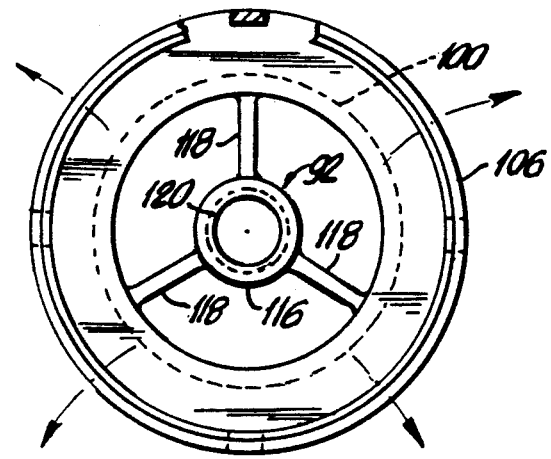

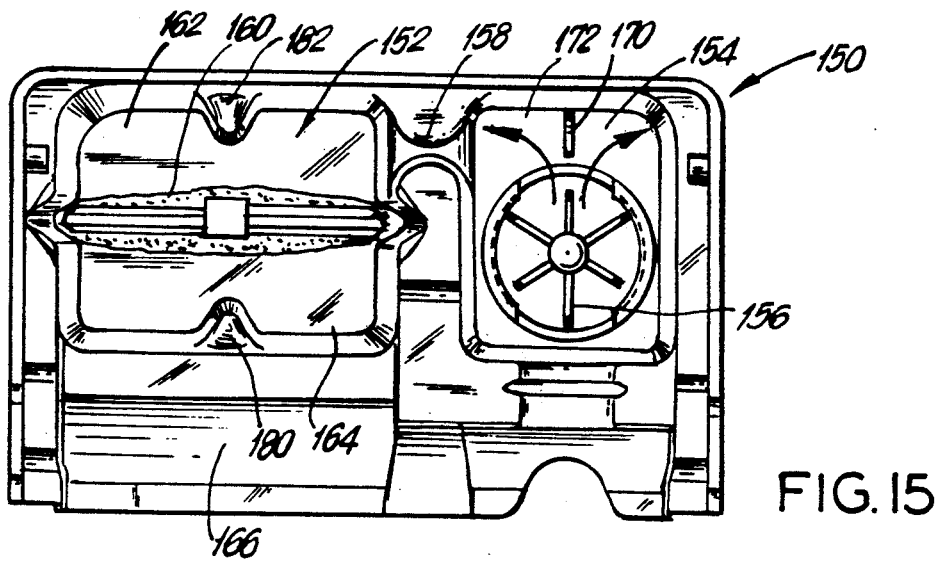
FIG. 15
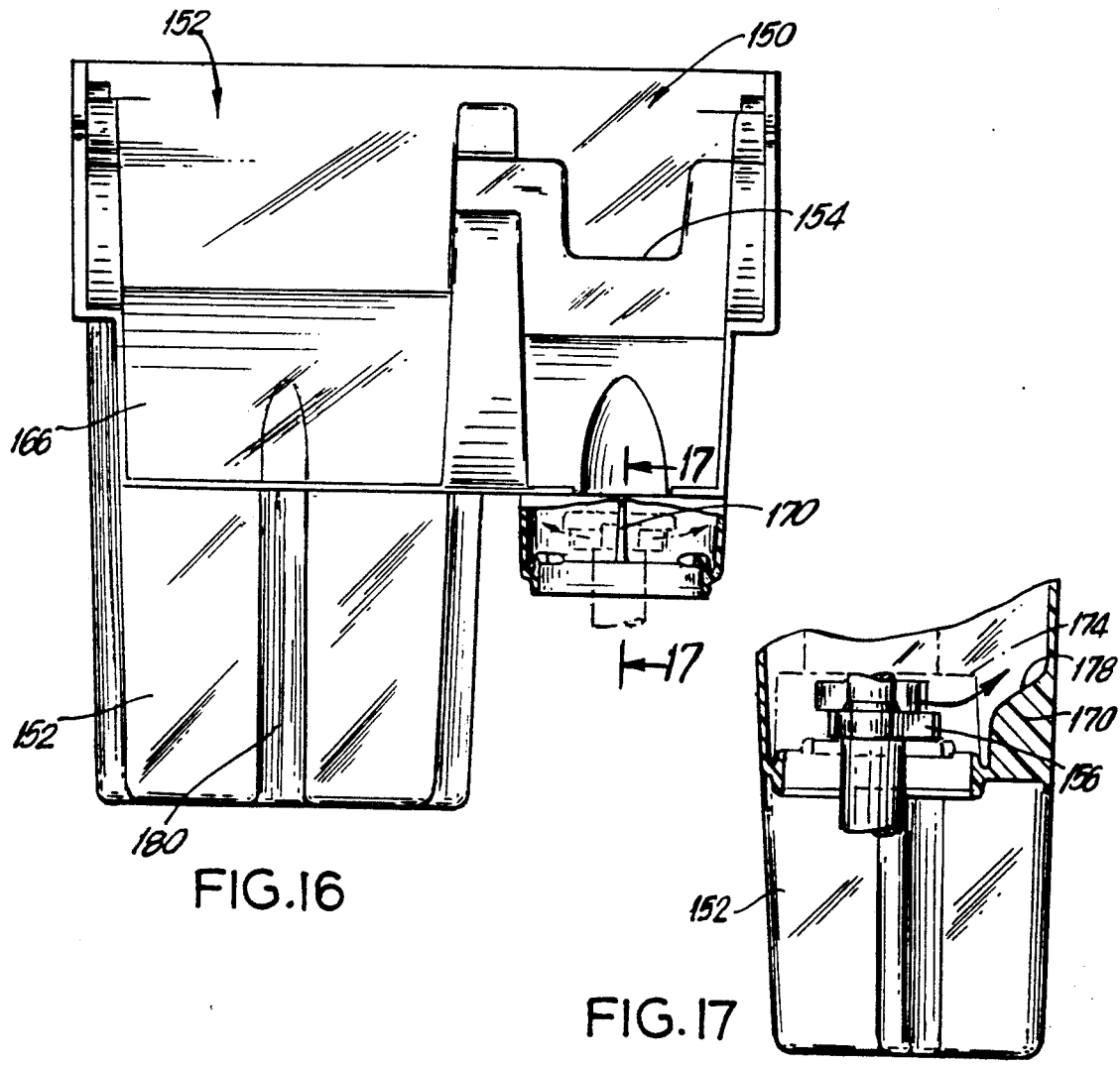
FIG. 16
FIG. 17

IMPELLER ASSEMBLY FOR AQUARIUM POWER FILTER

This is a division of application Ser. No. 07/533,739, filed Jun. 5, 1990 and now allowed now abandoned.

BACKGROUND OF THE INVENTION

This invention relates to an aquarium filter assembly including a water holding tank with filter material and an internal pump for driving water through the filter material. More particularly, the invention relates to an aquarium filter assembly having a plurality of water-holding tanks symmetrically disposed about the pump, and wherein the pump is provided with a housing configured with water ports and a flow diverter for directing water uniformly to all tanks, an impeller of the pump and the impeller housing having being configured for reduced noise.

An aquarium is constructed generally as a tank for holding water and marine life, and includes a filtration system for filtering the water. One form of external filtration system of particular interest herein is constructed as a filter assembly which includes a filter tank with filtration material therein, and a pump for driving water through the filtration material. The assembly is provided with an inlet water conduit for induction of water from the aquarium tank and a spillway for returning water from the filter assembly to the aquarium tank. The pump, which includes an electric motor and an impeller driven by the motor, may be located in a bottom portion of the assembly with the impeller directed upward for engaging with the inlet water conduit for directing water into the filter tank. The filter assembly is constructed preferably in a fashion wherein the filter assembly is draped exteriorly over a wall of the aquarium tank with the filter tank and pump located outside the aquarium tank. The inlet conduit and the spillway arch over the wall of the aquarium tank to communicate with water in the aquarium tank. The foregoing configuration of a filter assembly has proven to be very convenient in use, and very effective in operation. Such filter assemblies and the construction of various parts thereof are covered in one or more of the following issued patents, all issued to the assignee of the present invention: U.S. Pat. Nos. 4,512,885; 4,602,996; 4,735,715; 4,761,227; 4,783,258; 4,842,727 and 4,861,468.

There has also been provided a filter assembly in a larger size for use with a larger aquarium. In the larger size of filter assembly, a plurality of filtration elements are employed in separate filter tanks with water flowing along parallel courses to the respective filter tanks. Separate outlet spillways are provided for separate ones of the filter tanks to facilitate the flow of water, and also to provide a convenient configuration to the filter assembly for draping the filter assembly over the wall of the aquarium tank. A single pump impeller is employed in a common inlet conduit.

In one configuration of the larger proposed filter assembly, there are two filter tanks located side-by-side, both tanks contacting a wall of the aquarium tank upon a mounting of the filter assembly upon the wall of the aquarium tank. In order to distribute water uniformly to both filter tanks, and in order to provide a structure which is rigid and convenient to use, a common inlet conduit is located in a central transverse plane of the assembly between the two filter tanks. In prior art assemblies, the motor unit includes a collar which extends into the inlet chamber and forms a housing which envelops the impeller, and is provided with outlet ports. Upon rotation of the impeller about a longitudinal axis thereof, the impeller causes a stream of inlet water to flow in the housing and which exits the housing via the outlet ports in a direction generally perpendicular to the rotational axis to flow toward the two filter tanks. The two filter tanks are formed as portions of a larger housing including a central corridor for directing water from the impeller to the two filter tanks.

The foregoing filter assembly with the two filter tanks has proven to be effective in the filtration of the aquarium water. However, two problems have been noted. First, due to the rotational movement of the impeller, outlet water from the impeller tends to be directed preferentially to one of the two filter tanks. This results in a utilization of a filter element in one tank at a higher rate than the filter element in the other tank with the result that filter replacement is required at more frequent intervals than would be the case if both filter elements were utilized at the same rate. Secondly, the use of the rotating impeller to provide the stream of water at a substantially higher rate of flow, due to the need to provide water to a plurality of filter tanks rather than a single filter tank, produces a sufficient amount of noise to be objectionable to persons observing marine life in the aquarium. Furthermore, during operation a stream of water is formed in the inlet chamber which rises toward the cover of the filter and can cause vibration in the cover on the filter.

SUMMARY OF THE INVENTION

The aforementioned problems are overcome and other advantages are provided by an aquarium filtration system comprising at least one filter tank with a respective filter element and, wherein, in accordance with the invention, a rotatable water pump impeller is provided with a blade configuration which reduces noise during a pumping of water from an aquarium tank to the filter tanks. In another configuration, the blades serve to reduce turbulence of the water in the filtration system. In addition, a housing of the inlet water conduit can be configured in the manner of a cage with an array of outlet ports which fully encircle the impeller to facilitate the flow of water from the impeller. A water stream diverter can also be included. In the situation when there are two water tanks in the filter, the diverter has the form of a pyramid and is located adjacent to the impeller cage for directing water outputted by the impeller into two substantially equal streams which flow at substantially equal rates to each of two filter tanks of the filtration system. This provides for uniform utilization of the filter elements in respective ones of the filter tanks and also tends to impede the impact of the water flow whereby the turbulence and the rising stream are minimized and tends to be eliminated. In this regard, the water diverter need not be only in the shape of a triangular diverter. Other shaped diverters can be used. For example, in a single tank filter, a single fin diverter produces the effect of reducing turbulence and noise.

In accordance with a feature of the invention, the impeller is mechanically coupled to the rotor of an electric motor, both the impeller and the rotor being rotatable upon a common shaft. A housing of the motor is fully retractive away from the impeller so that the impeller is in full view on the outlet ports of the impeller cage to ensure an unobstructed flow of water from the impeller through the outlet ports. The impeller includes a central member which comprises a stem for connection with the motor rotor, and a hub which projects from the top of the stem for supporting the impeller blades. The stem has an outer cylindrical surface, and the hub has an outer surface in the form of the frustum of a cone, the frustum terminating in an apex which face the incoming stream of water. At least five blades, preferably six blades, extend radially outward from the frustoconical surface of the hub, and are uniformly arranged about a central axis of the hub. Peripheral edges of the blades are curved in a generally circular form over a region in excess of a semicircle. In each blade, a forward portion of the blade adjacent the apex of the hub is angled relative to the central axis, the forward edges of the blades flaring forwardly and outwardly from the central axis. A back edge of each blade, is directed approximately perpendicularly to the central axis. In another embodiment the six blades can be formed in two layers of three blades each with the blades being alternating.

In accordance with a further feature of the invention, in one embodiment the stream diverter is constructed as a pyramid of three sides in which two of the sides meet along an edge which faces the impeller. The two sides, being inclined, direct water from the impeller both upwardly and outwardly to the two filter tanks for uniform utilization of their respective filter elements. Where only one filter tank is used, a single fin diverter is used.

BRIEF DESCRIPTION OF THE DRAWING

The aforementioned aspects and other features of the invention are explained in the following description, taken in connection with the accompanying drawing wherein:

FIG. 3 is a sectional view of the filter assembly taken along the line 3—3 in FIG. 2, FIG. 3 being simplified by deletion of a collar of a motor housing surrounding a stem of the impeller;

FIG. 6 is a side view of a mechanical assembly of the impeller and a rotor of an electric motor, the impeller and the rotor being shown as a unitary assembly disposed for rotation about a shaft, an outline of the motor housing being indicated in phantom to show relative positions of the rotor and the impeller relative to the motor housing;

FIG. 7 is a top view of the impeller taken along the line 7—7 in FIG. 6;

FIG. 8 is a side elevation view of a terminus of the inlet water conduit including a cage-shaped housing for enclosing the impeller of FIGS. 6 and 7;

FIG. 9 is a sectional view of the terminus of the inlet conduit, taken along the line 9—9 in FIG. 8;

FIG. 10 is an end view of the terminus of the inlet conduit, taken along the line 10—10 looking down upon the terminus of the inlet conduit in FIG. 9;

FIG. 11 is an end view of the terminus of the inlet water conduit, taken along the line 11—11 looking up at the terminus of the conduit in FIG. 9;

FIG. 12 is an enlarged view showing details in a tab formed within a wall of the terminus of the inlet conduit, the location of the details being indicated in FIG. 9; and FIG. 13 is a fragmentary sectional view of a cage-shaped housing, taken along the line 13—13 in FIG. 10;

FIG. 15 is a top view of a filter assembly having a single tank and having the top cover removed to expose the use of a single fin diverter in the inlet chamber;

FIG. 16 is a front view of the filter assembly of FIG. 15 and showing the positioning of the single fin diverter in the inlet chamber;

FIG. 17 is a sectional view taken along lines 17—17 and enlarged to show the position of the single fin diverter;

DETAILED DESCRIPTION OF THE INVENTION

Figure 1:
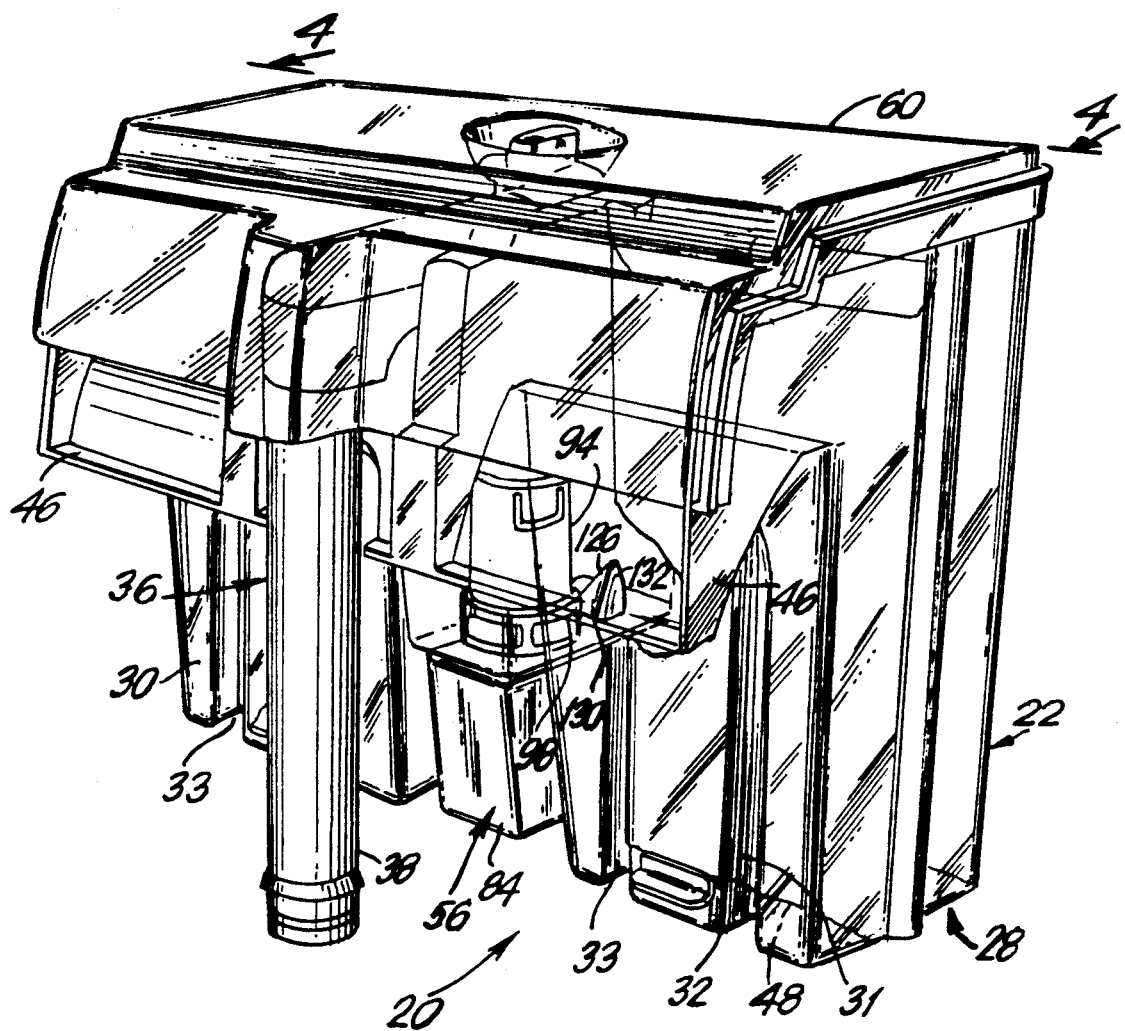
FIG. 1 is a perspective view of a filter assembly of the invention comprising two filter tanks disposed on opposite sides of a centrally located pump, the view showing a front side of the filter assembly with a pair of spillways and an inlet conduit configured for arching over a wall of an aquarium tank for communication with water in the aquarium tank, a portion of the view being cut away to show the pump and the stream diverter.
Figure 2:
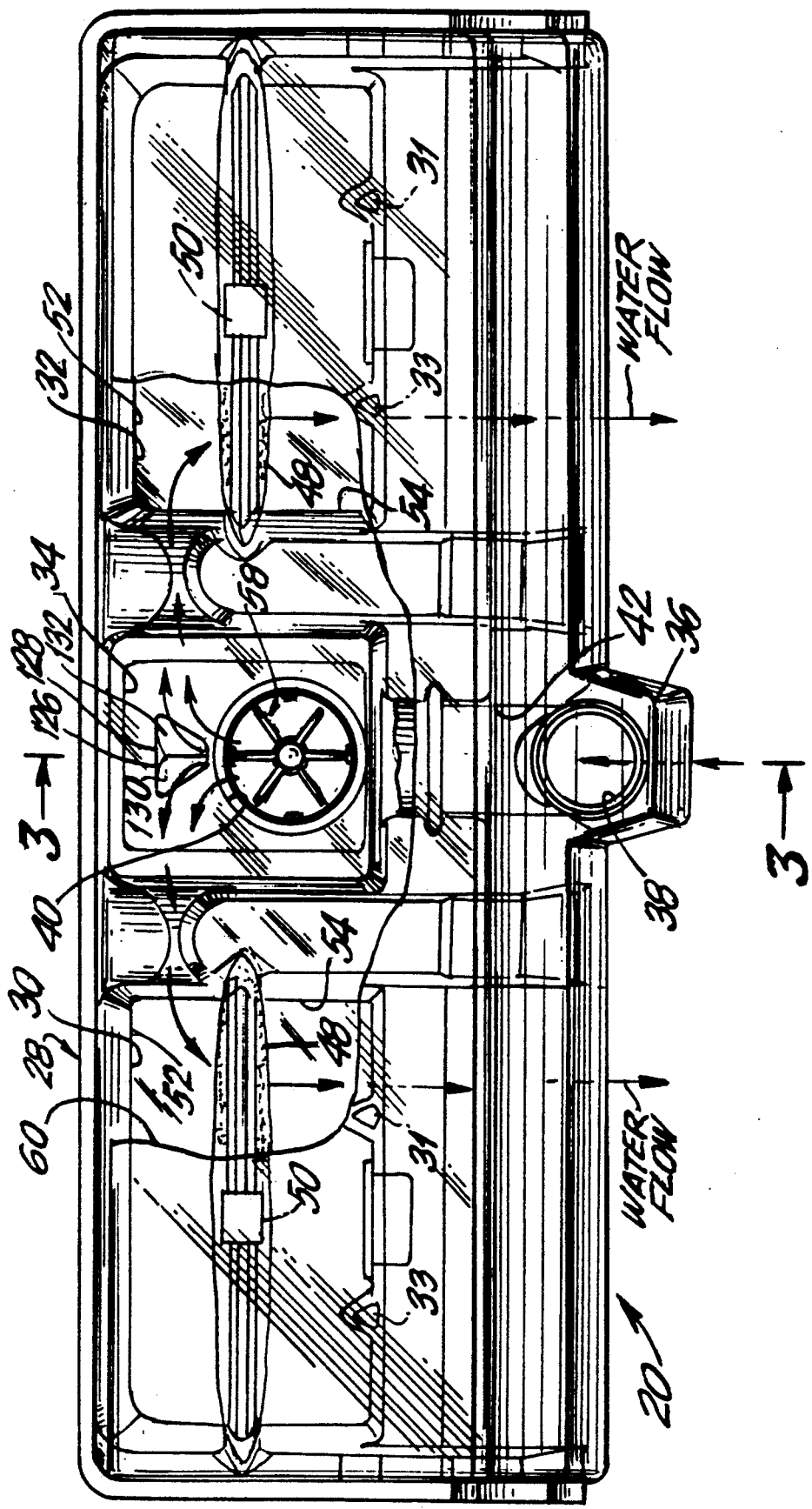
FIG. 2 is a top view of the filter assembly of FIG. 1, a portion of the view being cut away to show an impeller of the pump, the stream diverter, and a corridor which carries water from the pump and the diverter to the filter tanks.
Figure 4:
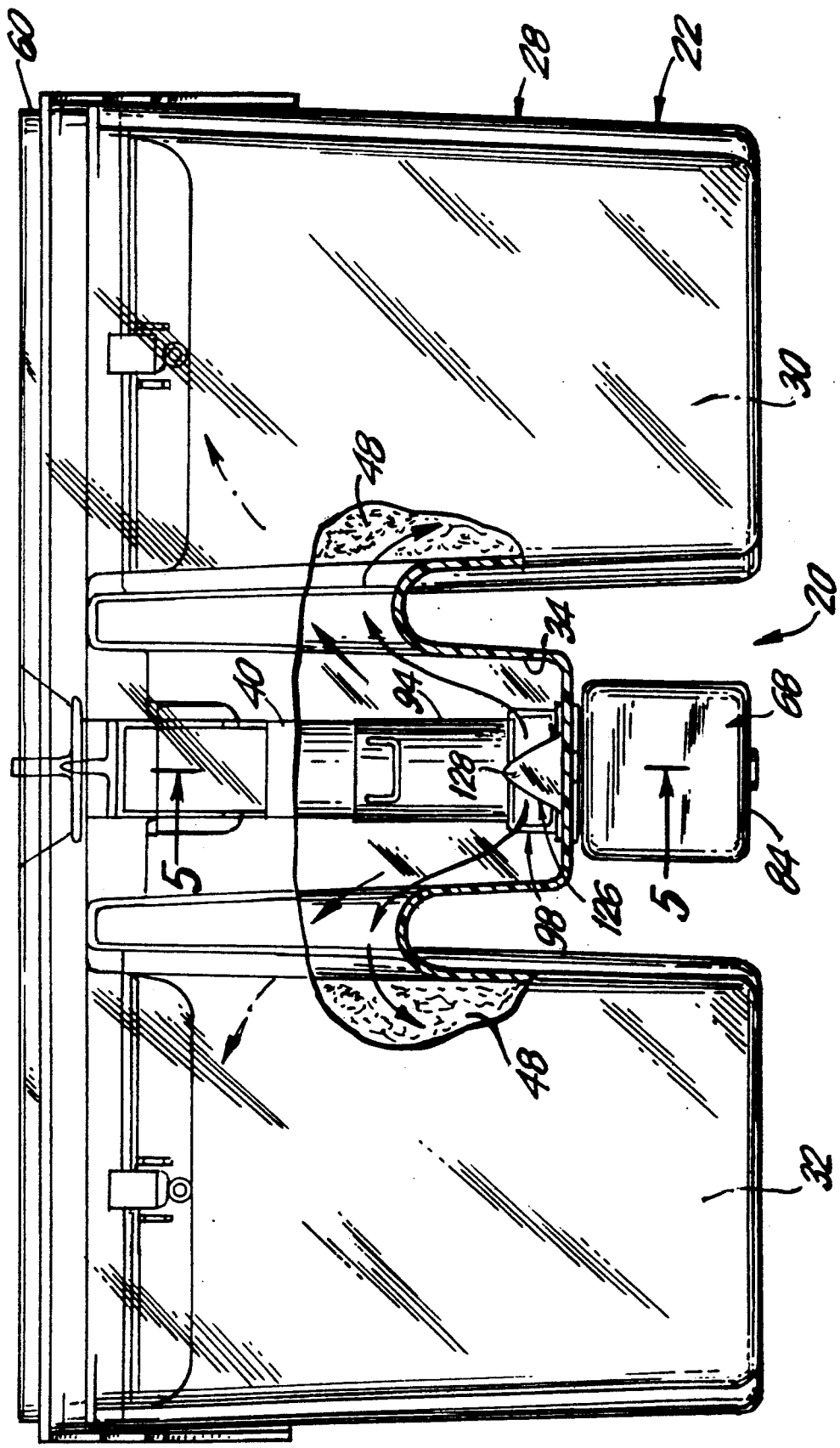
FIG. 4 is a rear elevation view of the filter assembly of FIG. 1, taken along the line 4—4 in FIG. 1, the view being cut away to show a back side of the stream diverter, and a corridor for carrying water from the diverter to the two filter tanks.
Figure 5:
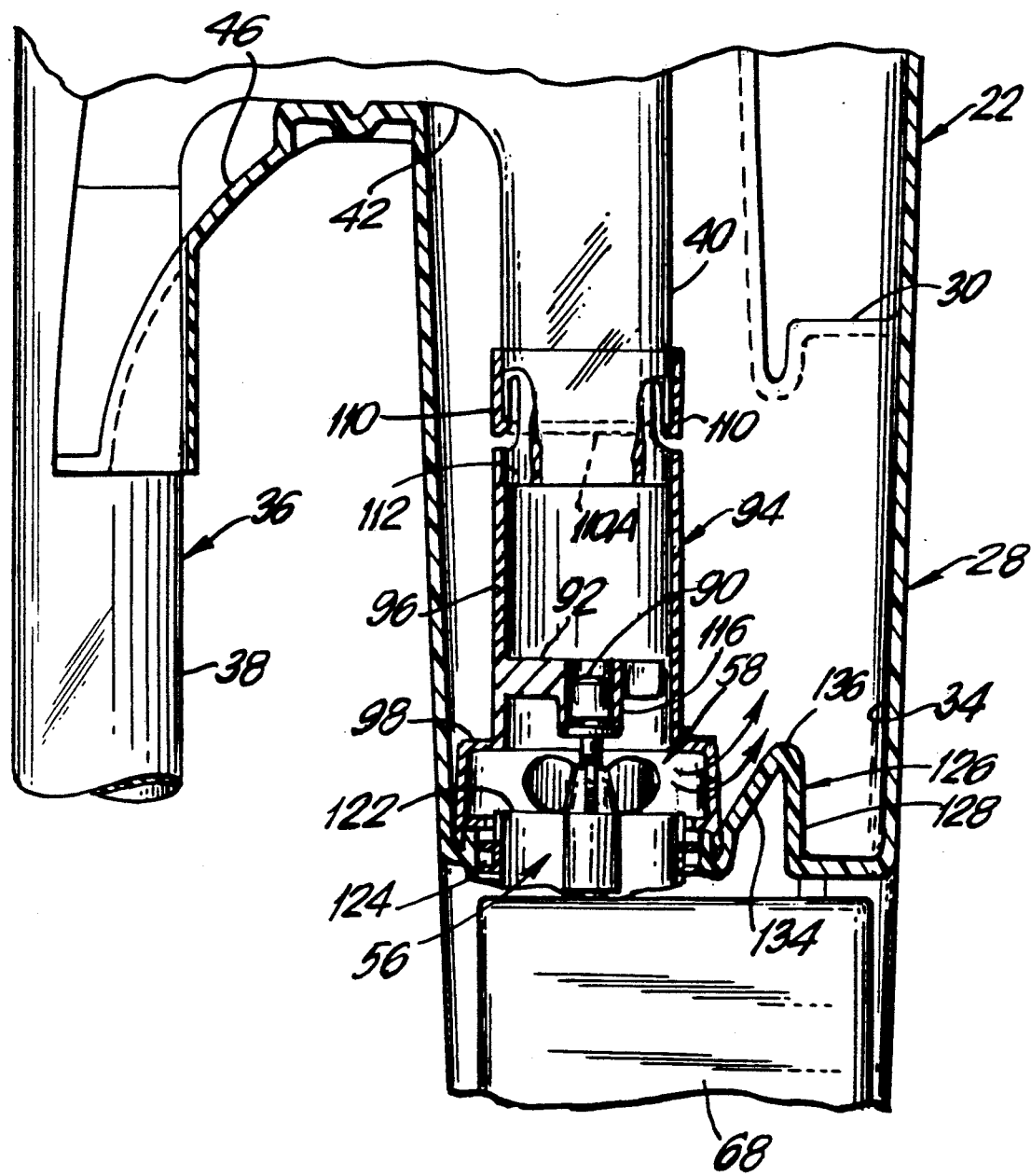
FIG. 5 is a sectional view of the filter assembly, taken along the line 5—5 in FIG. 4, the view including a collar extending from the motor housing and surrounding a stem of the impeller, the view also showing a terminus of the inlet water conduit and its position relative to the impeller.

FIGS. 1-5 show a filtration system 20 constructed in the form of an external filter assembly 22 which can be mounted upon the wall 24 of an aquarium tank 26, shown in phantom in FIG. 3. The assembly 22 comprises a housing 28 defining a first filter chamber 30, a second filter chamber 32, and an interconnecting section 34 which serves as the intake chamber. The filter chambers 30 and 32 are located side-by-side with the intake chamber 34 being disposed between the two filter chambers 30 and 32. A unitary inlet assembly 36 comprises an intake tube 38, a discharge tube 40, and a transverse tube 42 which is in communication with and joins the intake tube 38 and the discharge tube 40. Upon a mounting of the filter 22 to the tank wall 24, the intake tube 38 dips into water 44 contained within the aquarium tank 26. Each of the filter chambers 30 and 32 is provided with a spillway 46 which arches over the tank wall 24 to discharge excess water from the filter chambers 30 and 32 back into the aquarium tank 26. A pair of stiffening ribs 31, 33 are provided on the front of each of the tanks 30 and 32.

Each of the filter chambers 30 and 32 is provided with a respective filter cartridge 48 containing filtration material and having a clamp 50 for closing the top of the filter cartridge. The filter cartridges 48 extend in the longitudinal direction of the filter 22, this direction being parallel to the wall 24 of the aquarium tank 26. In each of the filter chambers 30 and 32, the filter cartridge 48 defines a contaminated water compartment 52 of unfiltered water behind the filter cartridge and a clear water compartment 54 of filtered water in front of the filter cartridge. A water pump 56 having an impeller 58 located at a terminus of the discharge tube 40 urges water to flow from the discharge tube 40 via the inlet chamber 34 into the contaminated water compartment 52 of respective ones of the filter chambers 30 and 32. Action of the pump 56 draws a stream of water which flows from the aquarium tank 26 into the filter 22 and through the filter cartridges 48 for filtering the water. Under force of the pump 56, the water then returns via the spillways 46 back into the aquarium tank 26. The filter 22 includes a removable cover 60 which closes off the top of the filter chambers 30 and 32 and their spillways 46.

In accordance with a feature of the invention, and as shown in FIGS. 2-3 and 5-7, the impeller 58 comprises a central member 62 disposed for rotation about a shaft 64. The central member 62 comprises a cylindrical stem 66 on an upper side of the impeller 58 facing an electric motor 68 of the pump 56. The central member 62 further comprises a frustoconical hub 70 which extends forward of the stem 66 and supports a set of six blades 72 which are positioned symmetrically, by an angular spacing of about 60 degrees, about a longitudinal axis of the shaft 64. The longitudinal axis of the shaft 64 coincides with a central axis of symmetry of the frustoconical hub 70, and also serves as an axis of rotation about which the impeller 58 is to be rotated by the electric motor 68. The blades 72 are each formed of a disk with a curved outer periphery, the disk being a portion of a circular disk in a preferred embodiment of the invention. The disk of each of the blades 72 has a curved perimeter greater than a semicircle, and joins with the hub 70 at a chord of the disk.

A ray of the frustoconical surface of the hub 70 is inclined relative to the central axis of the hub 70 at an angle in the range of approximately 10-30 degrees. Thus, the chord of each blade disk, at the junction with the hub 70, is inclined correspondingly. As a result, the top, or most forward portion 74 of the blade 72 extends forward of a top face 76, or apex, of the hub 70. The forward portion of each blade 72, at a location adjacent the top face 76, is inclined relative to the central axis at an angle in a range of approximately 35-75 degrees. A lower end 78 of a blade 72 exits from the hub 70 with an orientation approximately perpendicular to the central axis.

The configuration of the impeller 58 is believed to provide for smaller vortices in water expelled from the impeller 58 than would be the case with a configuration of an impeller in which the blades were spaced apart with a greater spacing, or other shape. The smaller vortices are believed to reduce the intensity of sound emitted by the process of pumping the water from the inlet conduit 36 to the filter chambers 30 and 32. Also, the rounded forward portions 74 of each blade 72 is believed to create a smoother transition in fluid movement of an inlet stream from the discharge tube 40 to an outlet stream from the housing 94. The smooth transition is believed also to reduce noise of the water pumping process.

The electric motor 68 includes a laminated stator 80 indicated diagrammatically in phantom, and a rotor 82 disposed within a motor housing 84. The rotor 82 is secured rotatably about the shaft 64 and is mechanically connected to the stem 66 of the impeller 58 for imparting rotation to the impeller 58 upon energization of the electric motor 68. The motor housing 84 is impervious to water, and includes a cylindrical well 86, indicated in phantom, which receives the water and in which sits the rotor 82. The well 86 allows the magnetic field of the stator 80 to magnetically couple the rotor 82 for operation of the motor 68. An inner bushing 88 is secured to one end of the shaft 64 for positioning the shaft 64 within the well 86. An outer bushing 90 is secured to the opposite end of the shaft 64 for holding the opposite end of the shaft 64 within a spider 92.

The particular impeller assembly 56 shown is somewhat similar in nature to those utilized for smaller versions of the filter assembly. However, in this case it is sized to fit uniquely into the larger filter assembly shown in FIGS. 1-4 having two tanks. In order to prevent utilization of this enlarged sized impeller assembly with some of the smaller versions of the filter housing, while the lower inner bushing 88 is made the same size as those of other impeller units, the upper bushing 90 is sized larger than the usual so that it will only fit into the correspondingly provided enlarged seat in the housing of the two tank version, shown in FIGS. 1-4.

Figure 14A:
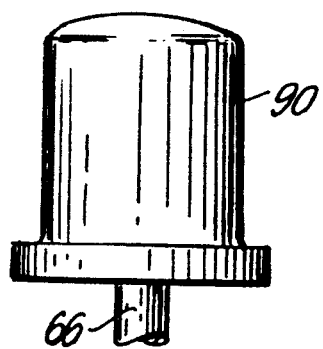
FIG. 14A is an enlarged view showing the top bushing of the impeller assembly shown in FIG. 6 before insertion within the cage.
Figure 14B:
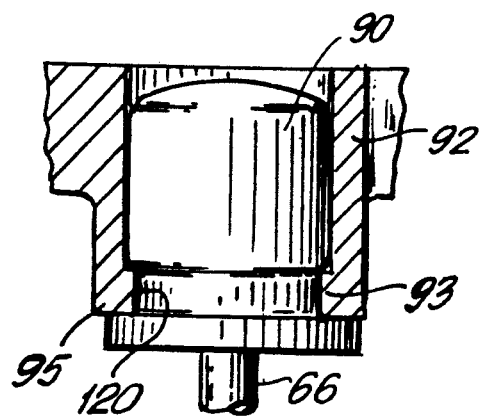
FIG. 14B is an enlarged view showing the bushing received in the cage and held securely in place by a slight deformation of the bushing.

The spider 92 is located in a terminus of the discharge tube 40 of the inlet conduit 36, as will be described below. The outer bushing 90 is secured by positive interference with the spider 92 so that the assembly of rotor and impeller can be held by the spider 92 during assembly of the filter 22, and to permit removal of the unitary assembly from the filter. With reference now to FIGS. 14A and 14B, it will be noted that the upper bushing 90 is shown in FIG. 14A as being of substantially cylindrical configuration in its assembly. The terminus end of the spider 92 includes a pair of inwardly directed legs 93, 95 forming a flange 120. This creates a smaller inner diameter than the outer diameter of the bushing. In this way, there is a positive interference between the bushing and the smaller inner diameter. This results in a squeezed fit as shown in FIG. 14B and causes a "mushroomed" shape to the bushing. It is understood that the bushing is formed of resilient material.

With reference to the drawings, and particularly FIGS. 8-13, the discharge tube 40 of the inlet conduit 36 terminates in a tubular assembly 94 comprising a tubular stem 96 and a housing configured as a cage 98 at the distal end of the tubular stem 96. The cage 98 encloses the impeller 58. The cage 98 is bounded at the top by the spider 92, and on the sides by a cylindrical wall 100. The wall 100 is of larger diameter than the tubular stem 96, and has a series of water outlet ports 102 disposed circumferentially around the cage 98. The wall 100 is formed of an upper ring 104 and a lower ring 106 which are joined by vertical frame elements 108 to define individual ones of the outlet ports 102. The outlet ports 102 have the appearance of cylindrical windows bounded by the frame elements 108 and the rings 104 and 106.

The tubular assembly 94 is joined to the discharge tube 40 with the aid of locking tabs 110 and a shoulder 112 which are formed within a cylindrical wall of the stem 96. The inner diameter of the tubular stem 96 is sufficiently large, relative to the outer diameter of the discharge tube 40 to enable the stem 96 to receive the tube 40. The tube 40 abuts the shoulder 112 while protuberances 114 on the tabs 110 (FIG. 12) engage an encircling groove 110A (FIG. 5) in the outer surface of the discharge tube 40 for locking the tube 40 within the stem 96 and against the shoulder 112.

The spider 92 is located within the stem 96 of the tubular assembly 94 above the upper ring 104. The spider 92 comprises a collar 116 and three arms 118 extending radially outward from the collar 116 to join with the cylindrical wall of the stem 96. The collar 116 includes the inner flange 120 which makes the interference engagement with the outer bushing 90 for securely holding the bushing 90 and the shaft 64 connected thereto.

The motor housing 84 includes a collar 122 (FIG. 5) which protrudes outwardly from the housing 84 to encircle the stem 66 of the impeller 58. The collar 122 extends upward within the lower ring 106 of the cage 98, and connects therewith with a bayonet looking arrangement. This form of lock permits the motor housing 84 to be secured to the filter housing 98 by simply inserting the collar 122 within an opening in the housing 98 and then twisting the motor housing 84 to operate the bayonet lock. The impeller 58 is positioned with its blades 72 located above and outside the collar 122 so as to be in full view of the outlet ports 102, thereby to permit unrestricted flow of water between the blades 72 and the outlet ports 102.

It should be appreciated that in the prior art arrangement, the ports for outflow of the water drawn in by the impeller were formed as part of the upwardly extending stem from the motor casing which continued into a collar surrounding the impeller. Since the collar was a continuous part of the stem, it was inserted through the cylindrical opening at the bottom of the intake chamber. Its size was therefore limited by the circumferential dimension of the stem and the corresponding cylindrical opening in the intake chamber. At present, the stem from the motor housing does not include any collar with the windows. As a result, the stem terminates below the level of the impeller. The ports are instead formed in an outer cage which depends from the intake tube. As a result, the cage can be enlarged to provide a wider housing through which the impeller rotates and through which the impeller discharges the water through the ports. This enlarged housing which is now formed as a depending part of the intake tube rather than an upstanding part of the motor stem, provides improved results. Specifically, there can now be an increased number of ports provided, whereby the water will disseminate from the impeller in various directions. Furthermore, the enlarged capabilities for the cage also permits a larger amount of water to flow out of the impeller through the ports. These features also aide in reducing the noise that heretofore existed.

The lengths of the frame elements 108 of the cage 98, upon being projected geometrically back against the central axis of the impeller hub 70, fall within the corresponding geometric projection of the blades 72 against the central axis of the impeller hub 70 so as to ensure alignment of the blades 72 with the outlet ports 102. With respect to the area of the cylindrical wall 100 of the cage 98, the outlet ports 102 comprise a substantially larger area of the cylindrical wall 100 than do the frame elements 108 so as to allow for substantially unrestricted flow of water from the impeller 58 through the outlet ports 102. Similarly, in the spider 92, the cross-sectional areas between the spider arms 118 are much greater than the areas of the arms 118, presented to an incoming stream of water, so as to present essentially unrestricted flow of the inlet stream of water.

In accordance with a further feature of the invention, the impeller 58 in conjunction with a stream diverter 126 (shown in FIGS. 1-5) acts to dispense water to the filter chambers 30 and 32, and to impede the flow of water and disperse the water equally between the filter chambers 30 and 32. The diverter 126 is located immediately behind the cage 98. The diverter 126 is formed generally in the shape of a pyramid and comprises a generally triangular backside 128 disposed vertically, and two triangularly-shaped sidewalls 130 and 132 which are configured as mirror images of each other. The sidewalls 130 and 132 extend forward from edges of the backside 128 to meet along a center edge 134 which faces the impeller 58. The center edge 134 and the impeller shaft 64 are coplanar. The sidewall 130 has both a sidewise and a rearward inclination for directing water towards the first filter tank 30. The sidewall 132 has a sidewise and a rearward inclination to direct water towards the second filter tank 32. The diverter 126 may be formed integrally with a floor of the intake chamber 34 and has a hub, the perimeter of which is triangular. The center edge 134 is inclined towards the rear (FIG. 5) and extends upwardly from a location substantially coplanar with the lower ring 106 to a location substantially coplanar with the upper ring 104 of the cage 98.

The diverter 126 prevents swirling water of the impeller 58 from developing a preferential direction of movement towards one of the filter chambers 30, 32, and provides for a dispersing of the output stream of water from the impeller 56 into two streams of equal flow to the corresponding filter chambers 30 and 32. In the preferred embodiment of the invention, the edges interconnecting the sides of the diverter 126 are rounded, and a top peak 136 of the diverter 126 is also rounded. The rounding of the edges allows for a smoother fluid path for reduction of noise developed by the moving water. The sidewalls 130 and 132 are inclined, relative to a horizontal base plane of the diverter 126 at an angle in the range of approximately 55-65 degrees.

The foregoing construction provides for rapid delivery of water in equal amounts to each of the filter chambers while minimizing noise produced by the pumping of water. This construction equalizes utilization of filter elements within the filter chambers.

In addition to providing equalization of dispersion, the triangular diverter also serves to impede the flow of the water as it exits from the ports of the cage. In this manner, the triangular shape, while preferable with respect to the particular filter shown in FIG. 1 having two tanks, can be made in other shapes.

By way of example, with reference now to FIGS. 15-17, there is shown a filter assembly 150, of smaller size than that shown in FIG. 1 and specifically including only a single filter tank 152. Most of the parts of the filter, however, are identical to that previously described. Specifically, there is included the intake chamber 154, which receives the unitary intake assembly terminating at its lower end with an impeller 156. The water flows from the intake chamber 154 across the narrow constricted bridge 158 into the filter tank 152. A filter cartridge 160 is used to separate the rear portion of the filter tank which serves as the contaminated water compartment 162 and the forward part of the filter tank serving as the clear water compartment 164. A spillway 166 is provided from which the water filtered from the assembly can now flow back to the aquarium tank. A cover (not shown) would be placed over the filter in a manner similar to that shown in FIG. 1.

In the rear of the intake chamber 154, and specifically in the lower corner thereof, there is provided a diverter 170. In this case, the diverter is in the form of a single upstanding fin extending from a rear wall 172 of the intake chamber 154 and approaching toward the cage 174 which holds the impeller assembly 156. The upper edge of the fin 178 is arcuately shaped for ease of construction and for smooth flow of the water thereabove.

The singular fin serves as a diverter to impede the flow of the water as it exits from the ports about the impeller. The presence of this diverter serves to prevent turbulence and avoids the upswirling stream of water which might tend to dislodge and vibrate the cover.

It should also be noted, that the rib 180 is formed at the forward part of the filter tank 152. In this case, however, there is also provided a rib 182 at the rear of the filter tank. Because this particular filter assembly is of smaller size than that shown in FIG. 1, the filter tank 152 is narrower and accordingly the front and rear ribs 180, 182 also serve to restrain the filter cartridge 160 and hold it in place as it expands. The expansion of the filter cartridge would occur as additional debris accumulates and fills the filter cartridge. Because the filter tank 162 is of narrower size than its corresponding larger version as shown in FIG. 1, there could be a tendency of the enlarged filter cartridge sealing off the filter tank from front to back. The presence of the ribs 180, 182 prevent this occurrence and retains adequate spacing in the filter tank between the filter cartridge and the front and rear walls thereof.

Figure 18:
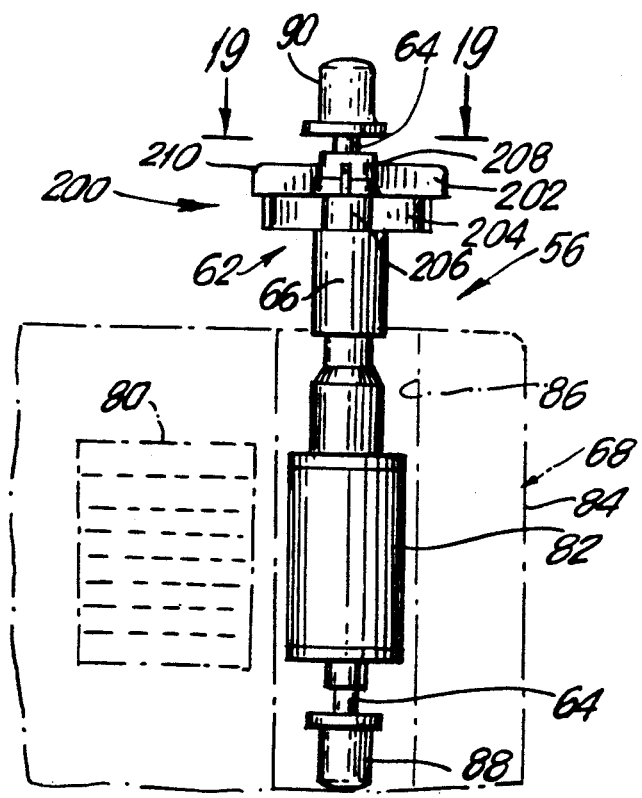
FIG. 18 is a side view of a mechanical assembly of another embodiment of the impeller and rotor of an electric motor, the view being similar to that shown previously in FIG. 6 for the first embodiment of the impeller.
Figure 19:
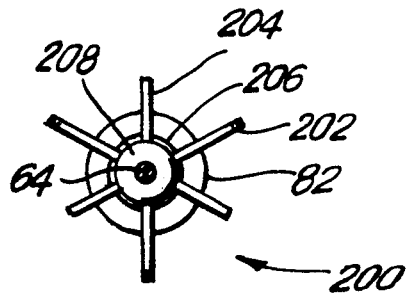
FIG. 19 is a top view of the impeller taken along lines 19—19 of FIG. 18.

In the case of the single filter tank filtration unit as shown in the FIGS. 15-17, it has been found that the turbulence of the water, and specifically the upsurge of the water toward the top cover is of particular significance. Accordingly, a slightly modified impeller has been found useful for such purposes. Referring to FIGS. 18 and 19, there is shown an impeller which is of substantially similar construction to that shown in FIG. 6 with the exception that the impeller blades 200 are of a different configuration. The other parts of the impeller unit are identified in a like manner to that previously shown in FIG. 6.

With respect to the blade construction, it is noted that there are again provided six blades. However, the blades are now provided in two levels, namely an upper level 202 having three blades and a lower level 204, likewise having three blades. The six blades are staggered, as shown in FIG. 19. The blades in the upper row, 202 are slightly larger than those in the lower row, 204.

The lower blades extend around an upper portion 206 of the cylindrical body portion 66. Thereabove, a frustoconical hub 208 supports the upper three blades. The shape of the blades in this case is substantially rectangular with slightly rounded edges 210. In the present case, the upper and lower bushings 88 and 90 are made of the same size.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. An impeller assembly for forcing water through an aquarium filter, the impeller assembly comprising:
    a shaft;
    an impeller; and
    means for rotating the impeller about said shaft, the impeller comprising:
    a frustoconical hub pointing in a direction along said shaft; and
    a set of substantially flat blades directed radially outward from said hub, said blades being distributed uniformly about said hub, sequential ones of said blades being angled relatively to each other about a central axis of said hub with an angle smaller than 90 degrees, wherein each of said blades has a circular periphery having an extent greater than a semicircle so as to reduce noise produced by moving water.

2. An impeller assembly according to claim 1, wherein there are six of said blades, sequential ones of said blades being angled relatively to each other with an angle of about 60 degrees.

3. An impeller assembly according to claim 1, wherein in said impeller hub, a ray of the frustoconical surface is inclined relative to said central axis of said hub at an angle in a range of approximately 10-30 degrees.

4. An impeller assembly according to claim 3, wherein in a portion of each of said blades adjoining an apex of said hub, the periphery of a blade is inclined relative to said axis and curves outwardly from said axis, said impeller being operative with a stream of water incident upon said impeller toward said apex, rotation of said impeller about said axis urging water away from said impeller in a plane perpendicular to said axis.

5. An impeller assembly according to claim 4 wherein, in a portion of each of said blades adjoining a portion of said hub opposite said apex, the periphery of a blade is substantially perpendicular to said axis.

6. An impeller assembly for forcing water through an aquarium filter, the impeller assembly comprising:
    a shaft;
    an impeller; and
    means for rotating the impeller about said shaft, the impeller comprising:
    a central hub including a frustoconical portion pointing in a direction along said shaft; and
    two sets of substantially flat blades including a set of upper blades directed radially outward from said hub and distributed uniformly about said frustoconical portion of said hub, and a set of lower blades, positioned beneath the set of upper blades and distributed uniformly about said hub, said set of lower blades alternating with said set of upper blades about said hub so as to reduce turbulence in a water surface, said blades being substantially rectangular in configuration, and
    wherein the set of upper blades and the set of lower blades are adjacent to each other in a direction of elongation of said shaft.

7. An impeller assembly according to claim 6, wherein the set of upper blades includes three blades and the set of lower blades includes three blades.

* * * * *

UNITED STATES PATENT AND TRADEMARK OFFICE
CERTIFICATE OF CORRECTION

PATENT NO.   : 5,238,367
DATED        : August 24, 1993
INVENTOR(S)  : Ellis et al.

Page 1 of 1

It is certified that error appears in the above-identified patent and that said Letters Patent is hereby corrected as shown below:

<u>Title page,</u>
Item [62], Related U.S. Application Data, "1990, abandoned." should read
-- 1990, now allowed. --

<u>Column 1,</u>
Line 6, "now allowed now abandoned." should read -- now allowed. --

Signed and Sealed this

Seventh Day of October, 2003

JAMES E. ROGAN
*Director of the United States Patent and Trademark Office*